(12) United States Patent
Matsuyama

(10) Patent No.: US 9,071,806 B2
(45) Date of Patent: Jun. 30, 2015

(54) REPRODUCING APPARATUS

(75) Inventor: Ichiro Matsuyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1161 days.

(21) Appl. No.: 12/501,190

(22) Filed: Jul. 10, 2009

(65) Prior Publication Data

US 2010/0014835 A1    Jan. 21, 2010

(30) Foreign Application Priority Data

Jul. 17, 2008  (JP) ................................. 2008-186242
May 15, 2009  (JP) ................................. 2009-119010

(51) Int. Cl.
| H04N 5/783 | (2006.01) |
| H04N 9/80 | (2006.01) |
| H04N 5/76 | (2006.01) |
| G11B 27/10 | (2006.01) |
| G11B 27/28 | (2006.01) |
| H04N 21/432 | (2011.01) |
| H04N 21/44 | (2011.01) |
| H04N 21/845 | (2011.01) |

(52) U.S. Cl.
CPC ................ H04N 5/76 (2013.01); G11B 27/105 (2013.01); G11B 27/28 (2013.01); H04N 5/783 (2013.01); H04N 21/4325 (2013.01); H04N 21/44008 (2013.01); H04N 21/8456 (2013.01)

(58) Field of Classification Search
None
See application file for complete search history.

(56) References Cited

U.S. PATENT DOCUMENTS

| 6,310,839 B1 * | 10/2001 | Lee et al. ................... 369/30.07 |
| 6,546,185 B1 * | 4/2003 | Kim et al. ..................... 386/230 |
| 6,973,256 B1 * | 12/2005 | Dagtas ........................... 386/241 |
| 7,505,671 B2 * | 3/2009 | Hagiwara et al. ............. 386/291 |
| 8,103,149 B2 * | 1/2012 | Kagawa ........................ 386/261 |
| 2005/0259959 A1 * | 11/2005 | Nagao et al. .................... 386/69 |
| 2008/0044085 A1 * | 2/2008 | Yamamoto .................... 382/190 |
| 2008/0138043 A1 * | 6/2008 | Murabayashi et al. ....... 386/124 |

FOREIGN PATENT DOCUMENTS

| JP | 2000-333117 A | 11/2000 |
| JP | 2002-8354 A | 1/2002 |
| JP | 2005-333381 A | 12/2005 |
| WO | 2006/059436 A | 6/2006 |

* cited by examiner

*Primary Examiner* — Heather Jones
(74) *Attorney, Agent, or Firm* — Canon USA, Inc. IP Division

(57) ABSTRACT

An apparatus which reproduces a movie from a recording medium, when receiving an instruction, reproduces the movie from a point associated with an appearance point of a feature portion.

11 Claims, 10 Drawing Sheets

100

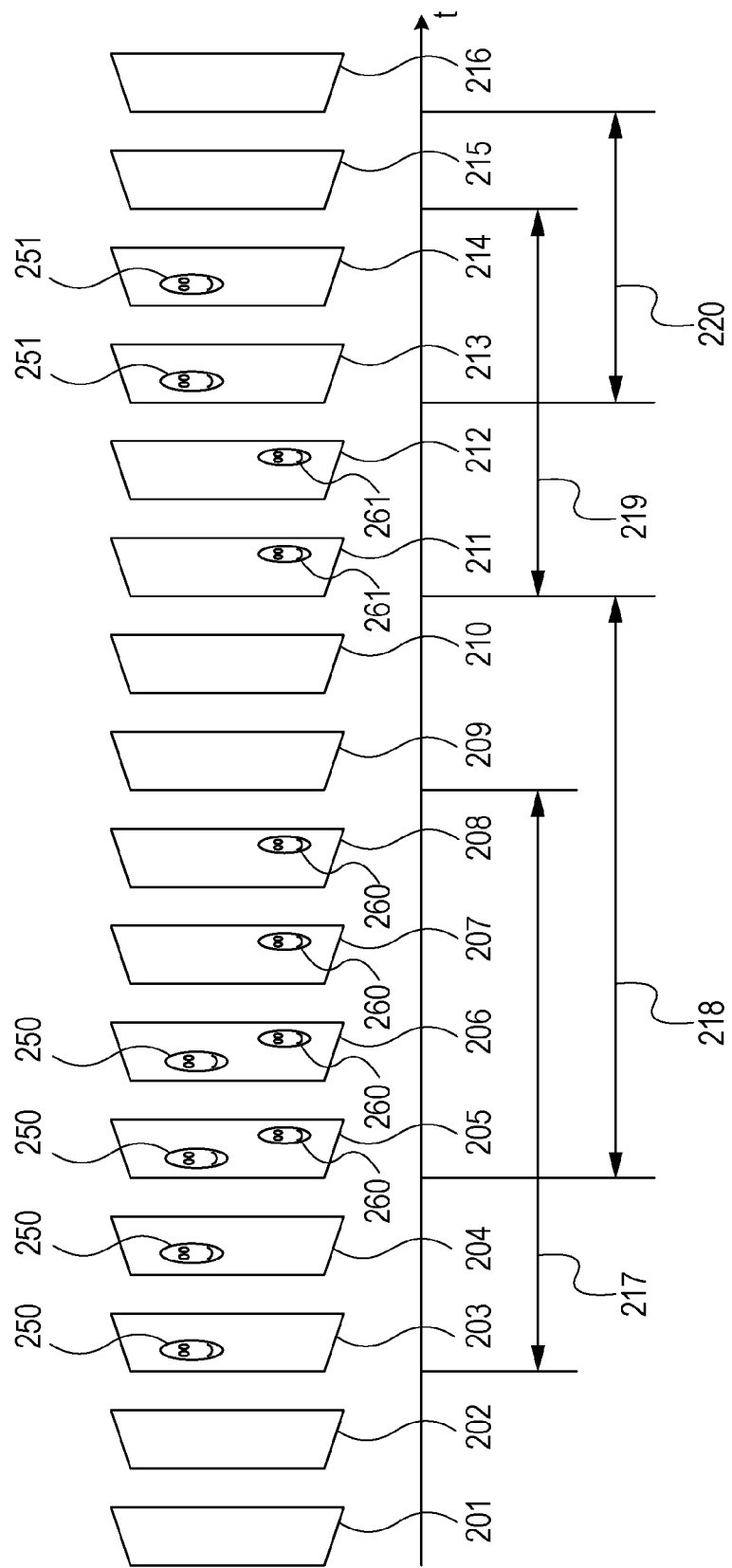

FIG. 3A
300

|  | POSITION | SIZE | APPEARANCE POINT | DISAPPEARANCE POINT |
|---|---|---|---|---|
| 250 | X103, Y103 | W103 | 203 |  |
|  |  |  |  |  |
|  |  |  |  |  |

FIG. 3B
300

|  | POSITION | SIZE | APPEARANCE POINT | DISAPPEARANCE POINT |
|---|---|---|---|---|
| 250 | X106, Y106 | W106 | 203 |  |
| 260 | X207, Y207 | W207 | 205 |  |
|  |  |  |  |  |

FIG. 3C
300

|  | POSITION | SIZE | APPEARANCE POINT | DISAPPEARANCE POINT |
|---|---|---|---|---|
| 250 |  |  | 203 | 207 |
| 260 | X207, Y207 | W207 | 205 |  |
|  |  |  |  |  |

FIG. 3D
300

|  | POSITION | SIZE | APPEARANCE POINT | DISAPPEARANCE POINT |
|---|---|---|---|---|
|  |  |  |  |  |
| 260 |  |  | 205 | 209 |
|  |  |  |  |  |

|  | APPEARANCE POINT | POSITION | SIZE |
|---|---|---|---|
| 250 | 203 | X103, Y103 | W103 |
|  |  |  |  |
|  |  |  |  |
|  |  |  |  |

|  | APPEARANCE POINT | POSITION | SIZE |
|---|---|---|---|
| 250 | 203 |  |  |
| 260 | 205 |  |  |
| 261 | 211 |  |  |
| 251 | 213 |  |  |

|  | APPEARANCE POINT |
|---|---|
| 250 | 203 |
| 260 | 205 |
| 261 | 211 |
| 251 | 213 |

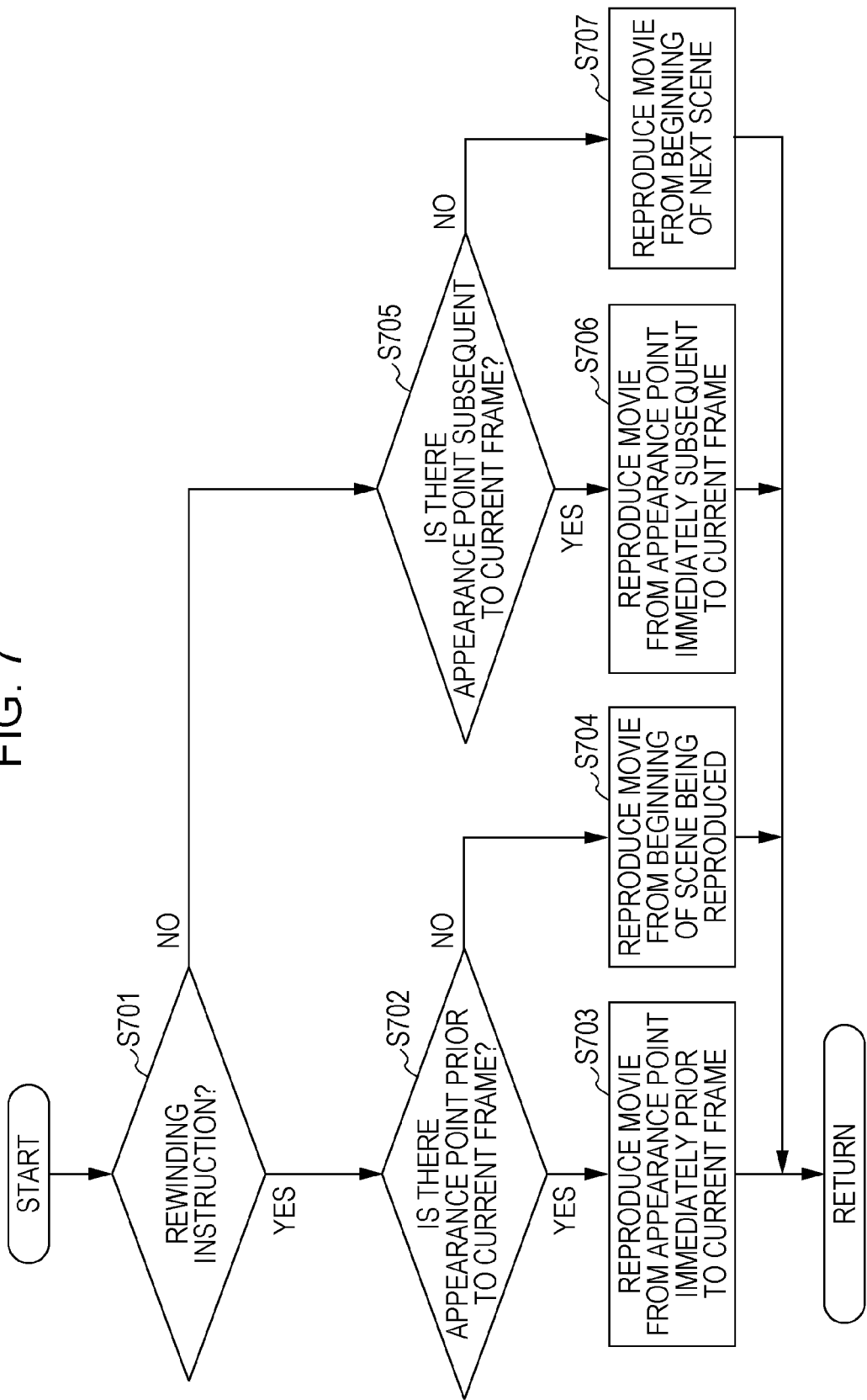

|  | POSITION | SIZE | APPEARANCE POINT | DISAPPEARANCE POINT | FEATURE INFORMATION |
|---|---|---|---|---|---|
| 250 | X103, Y103 | W103 | 203 |  | C103 |
|  |  |  |  |  |  |
|  |  |  |  |  |  |
|  |  |  |  |  |  |

|  | POSITION | SIZE | APPEARANCE POINT | DISAPPEARANCE POINT | FEATURE INFORMATION |
|---|---|---|---|---|---|
| 250 |  |  | 203 | 207 | Ave(C103~C106) |
| 260 |  |  | 205 | 209 | Ave(C205~C208) |
| 261 |  |  | 211 | 213 | Ave(C311~C312) |
| 251 |  |  | 213 | 215 | Ave(C413~C414) |

|  | ID | APPEARANCE POINT | DISAPPEARANCE POINT |
|---|---|---|---|
| 250 | 1 | 203 | 207 |
| 260 | 2 | 205 | 209 |
| 261 | 2 | 211 | 213 |
| 251 | 1 | 213 | 215 |

|  | POSITION | SIZE |
|---|---|---|
| 250 | X105, Y105 | W105 |
| 260 | X205, Y205 | W205 |

REPRODUCING APPARATUS

BACKGROUND OF THE INVENTION

1. Field of the Invention

The present invention relates to a reproducing apparatus, and specifically to a reproducing apparatus for a movie.

2. Description of the Related Art

Apparatuses are known that reproduce a movie recorded on a recording medium, such as a disk medium. Different from still images, it is difficult to know the content of a movie in a short period of time. Hence, in order to make it possible to know the content of a movie in a short period of time, some of such apparatuses have a fast reproduction function, or a function of displaying, in a list screen, predetermined frames of a movie as thumbnail images.

Apparatuses, such as video cameras, are also known that capture a movie or a still image and record them on a recording medium. In general, objects of a movie a user captures with a video camera often include a person.

In recent years, in accordance with advances in face recognition technology, a technology has been developed that allows reproduction of scenes which include a person, from a recorded movie. For instance, a technology is disclosed (for example, in Japanese Patent Laid-Open No. 2002-8354) that allows a user to display a list of the faces of persons included in a movie or to display scenes including the faces of persons in a time sequence, thereby reproducing scenes corresponding to a face selected by the user.

When a recorded movie is reproduced as described above, each scene is usually reproduced sequentially from the beginning thereof. Usually, an important scene is repeatedly reproduced after rewinding and an unimportant scene is reproduced in a fast forwarding mode or by skipping in units of several seconds to a little more than 10 seconds, for example.

Hence, some operation to repeatedly reproduce an important scene or to skip unimportant scenes in reproduction may be performed. Further, during reproduction of a movie, a user is to perform operations for rewinding or fast-forwarding when the user wants to repeatedly reproduce a scene including a specific face. In addition, the technology described in Japanese Patent Laid-Open No. 2002-8354 does not allow a user to start by cueing a scene including a specific face during reproduction of a movie, and hence operation to interrupt the reproduction of a movie or to go back to a selection screen to display a list of images or images in a time sequence, etc., may be performed.

SUMMARY OF THE INVENTION

In view of the above situations, the present invention provides an apparatus that allows easy operations for reproduction.

Further features of the present invention will become apparent from the following description of exemplary embodiments with reference to the attached drawings.

BRIEF DESCRIPTION OF THE DRAWINGS

FIG. 2 illustrates changes in a movie signal.

FIGS. 3A to 3D are example management tables.

FIGS. 6A to 6C show management tables and a record table.

FIG. 7 is a flowchart of a process performed during reproduction.

FIGS. 8A to 8C show management tables and a record table.

DESCRIPTION OF THE EMBODIMENTS

Figure 1:
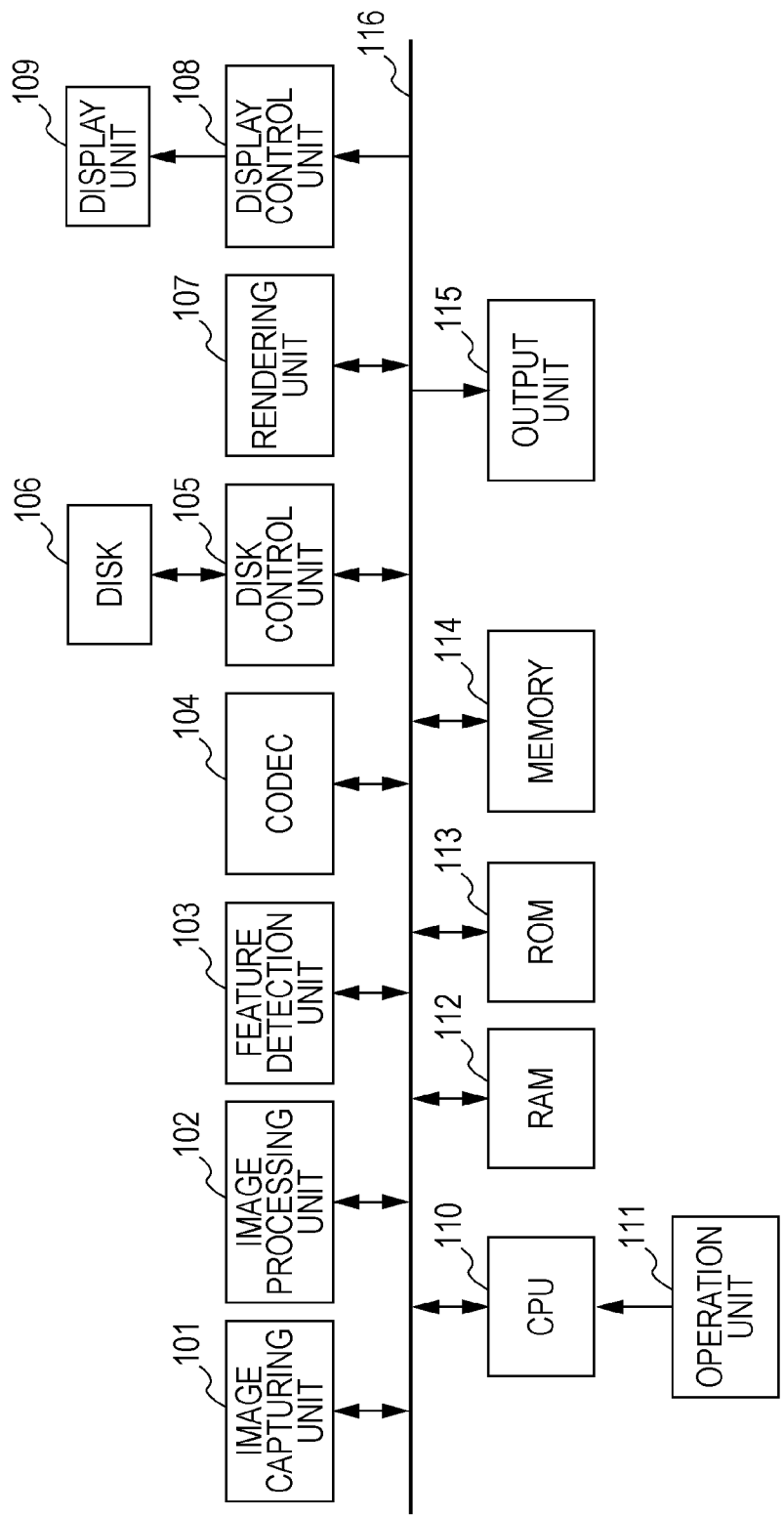
FIG. 1 is a block diagram showing a configuration of a video camera according to an embodiment of the present invention.

In a first embodiment, a case in which the present embodiment is applied to a digital video camera that records a movie on a disk recording medium is described. FIG. 1 shows a block diagram of a video camera 100 according to an embodiment of the present invention.

A CPU 110 is connected to a RAM 112, a ROM 113, and each of other blocks via a bus 116. The CPU 110 controls each block in accordance with a control program stored in the ROM 113. The CPU 110 uses the RAM 112 as a storage device for storing temporary data during operation, and performs various processing in accordance with instructions from an operation unit 111. The operation unit 111 is provided with various switches, such as a power switch, a recording switch for giving an instruction to start and stop recording, and a reproducing switch for giving an instruction to reproduce a recorded movie. A memory 114 is used for storing a signal (i.e., movie signal), for the processing performed in each block, and other data.

An image capturing unit 101 includes lenses, an aperture, an image sensor, and the drivers for them, etc., and captures a movie of an object and outputs a movie signal. An image processing unit 102 receives a movie signal from the image capturing unit 101 during recording, and receives a movie signal from a CODEC 104 during reproduction under the control of the CPU 110. The image processing unit 102 performs various image signal processing such as color conversion and resolution conversion for the received movie signals. A feature detection unit 103, using the memory 114, detects and obtains additional information such as the number, sizes, and positions of feature portions included in a movie, on the basis of a captured movie signal or a reproduced movie signal.

In the present embodiment, the feature detection unit 103 detects the face of a person as a feature portion. The CPU 110 manages a point on the time axis when an image of a face appears in a movie, on the basis of the detection result obtained by the feature detection unit 103. When faces are detected more than once, it is determined whether or not the detected faces are the same as one another. Note that the feature detection unit 103 may be configured to detect a specific image other than a face as the feature portion.

The CODEC 104 receives a movie signal from the image processing unit 102 during recording and encodes the movie signal using a publicly known moving picture encoding method, such as MPEG, to compress the amount of information. The compressed movie signal is stored in the memory 114. A disk control unit 105 reads the compressed movie signal from the memory 114 and stores it on a disk 106. Note that in the present embodiment, a hard disk drive (HDD) is used as a recording medium for recording a movie signal; however, another kind of recording medium, such as a memory card, a magnetic tape or an optical disk may be used.

During reproduction, the disk control unit 105 reads a movie signal from the disk 106 and stores it in the memory 114. The CODEC 104 reads a reproduced movie signal from the memory 114 and outputs the signal to the image processing unit 102 after decoding.

The image processing unit 102 processes a movie signal output from the image capturing unit 101 or a reproduced movie signal and stores it in the memory 114. A rendering unit 107, in accordance with instructions from the CPU 110, stores various character and graphic information in the memory 114 and superimposes it on a movie signal.

A display control unit 108 displays a movie signal read from the memory 114 on a display unit 109. Hence, a movie captured by the image capturing unit 101 is displayed on the display unit 109 during recording, and a reproduced movie is displayed on the display unit 109 during reproduction. An output unit 115 outputs a movie signal read from the memory 114 to a display apparatus or the like external to the video camera 100 and causes a captured or reproduced movie to be displayed.

In a recording mode, a movie captured by the image capturing unit 101 is displayed on the display unit 109. When a user gives an instruction to start recording through the operation unit 111, the movie signal captured by the image capturing unit 101 undergoes processing and is recorded on the disk 106, as described above. When a user gives an instruction to stop recording, recording of a movie data on the disk 106 is terminated. In the present embodiment, a series of movie data recorded during a period from a start-recording instruction to a stop-recording instruction given by a user is managed as one file, and one movie file is treated as one scene. Further, in the present embodiment, the image processing unit 102 creates, during recording, a representative image signal obtained by reducing the size of the first frame of a movie signal to be recorded. The disk control unit 105 records this representative image signal together with the corresponding movie file on the disk 106.

When instructed through the operation unit 111 to enter a reproduction mode, the CPU 110 gives the disk control unit 105 an instruction to reproduce representative-image signals recorded on the disk 106. The disk control unit 105 reproduces the representative-image signals recorded on the disk 106 and stores them in the memory 114. The rendering unit 107 creates an index screen showing a list of the representative images of the respective scenes on the basis of the reproduced representative-image signals and stores the index screen in the memory 114. The display control unit 108 displays this index screen on the display unit 109. A user, through operation of the operation unit 111, selects the representative image of a scene among the displayed representative images displayed in the index screen, and gives an instruction to reproduce the scene. The CPU 110, when instructed through the operation unit 111 to start reproduction, gives the disk control unit 105 an instruction to reproduce the movie signal of the selected scene. The disk control unit 105 reproduces the movie signal of the selected scene recorded on the disk 106, and the reproduced movie signal is displayed on the display unit 109, as described above.

Next, a rewinding process during movie reproduction will be described.

FIG. 2 shows changes in a movie signal of one scene among movie signals recorded on the disk 106. Each frame shown in FIG. 2 is a frame that has been selected from movie signals by the feature detection unit 103 and has undergone face detection processing performed by the feature detection unit 103, as will be described later. For instance, frames 201 to 216 are arranged at intervals of one second. Since a movie signal of 30 frames per second is recorded and reproduced in the present embodiment, FIG. 2 shows the case in which one frame out of every 30 frames is selected. In FIG. 2, frame 201 is the first frame of a scene, and frame 216 is the last frame of the scene.

In a movie shown in FIG. 2, a face 250 appears in frame 203 and disappears in frame 207. A face 260 appears in frame 205 and disappears in frame 209. A face 261 appears in frame 211 and disappears in frame 213. A face 251 appears in frame 213 and disappears in frame 215.

In FIG. 2, a reference numeral 217 denotes a period from the appearance of the face 250 until a predetermined period after the disappearance of the face 250. Here, the predetermined period is set at three seconds. A reference numeral 218 denotes a period from the appearance of the face 250 until a predetermined period after the disappearance of the face 260. A reference numeral 219 denotes a period from the appearance of the face 261 until a predetermined period after the disappearance of the face 261; however, in FIG. 2, since the last frame is reproduced two seconds after the face 261 disappeared, the period 220 ends in the last frame 216.

In the present embodiment, the appearance period of a face is managed by detecting a frame in which the face disappears, as well as by detecting a frame in which the face appears. During reproduction of a movie, when a rewinding operation is performed during a period from the appearance of a face until a predetermined period after the disappearance of the face, the movie is reproduced after going back to a point (frame) on the time axis at which the face appeared, which was included in or had disappeared immediately prior to a frame being displayed when the instruction was given.

Next, the operation of the video camera 100 during reproduction of a movie will be described.

As described above, a movie signal recorded on the disk 106 is reproduced and decoded by the CODEC 104. The decoded movie signal is processed by the image processing unit 102 and stored in the memory 114. The feature detection unit 103 detects face portions in the reproduced movie signal stored in the memory 114. In the present embodiment, the feature detection unit 103 detects faces included in frames that are selected at predetermined intervals from the reproduced movie signal. Here, faces are detected in frames selected at intervals of one second; however, the face detection may be performed for frames selected at intervals of more than or less than one second, or for all the frames.

When a face image is included in the reproduced frames, the feature detection unit 103 outputs information about the position and size of the face image to the CPU 110. Here, the position of the center of the face is output as the position information about the face.

At this time, the position of the center of a face is output in the form of the numbers of pixels in the horizontal direction (X direction) and the vertical direction (Y direction), where the top left corner of the screen is the origin. On the basis of the detection result output from the feature detection unit 103, the CPU 110 registers, in the RAM 112, the position and size of a detected face and the time (appearance point) at which the detected face appeared in the movie, in association with an ID for identifying the detected face. In the present embodiment, the appearance point is registered as an elapsed period (number of frames) from the start of a scene; however, any other form capable of specifying a point on the time axis may be used for the registration. When a face is not included in the reproduced frames, a detection result that a face is not included is output to the CPU 110. When a predetermined period (three seconds) has passed since a face that had been detected was no longer detected by the feature detection unit 103, the information about this face is deleted from the management table and the frame in which the face was no longer detected is registered as a disappearance point in the management table.

For instance, during reproduction of the movie signal shown in FIG. 2, the feature detection unit 103 outputs a detection result showing that a face is not included to the CPU 110 during reproduction of frames 201 and 202, since a face is not included in frames 201 and 202. The feature detection unit 103, when frame 203 is reproduced, detects the face 250, and outputs information about the position and size to the CPU 110. On the basis of the detection results output from the feature detection unit 103, the CPU 110 registers, in the RAM 112, the position and size of a detected face and the appearance point(frame 203) at which the detected face appeared in the movie, in association with an ID (250) for identifying the detected face. FIG. 3A shows a management table 300 at the time of reproducing frame 203.

Subsequently, the feature detection unit 103 also detects the face 250 during reproducing frame 204, the CPU 110 compares the detection result with the content registered in the management table 300. The CPU 110 determines that the face is the same as the face registered in frame 203 on the basis of the positions and sizes of the faces, and updates the position and size of the face 250 registered in the management table 300.

Likewise, during reproduction of frame 205, the feature detection unit 103 detects the face 260 in addition to the face 250, and the CPU 110 registers the position, size, and appearance point in the management table 300. FIG. 3B shows the content of the management table 300 during reproduction of frame 205. In this manner, the CPU 110 manages the appearance points, on the time axis, of a plurality of faces.

During reproduction of frame 207, only the detection result for the face 260 is output to the CPU 110. Consequently, the CPU 110 determines that the face 250 which had been continuously detected until frame 206 disappeared in frame 207, deletes the information about the position and size of the face 250 from the management table 300, and registers information about the disappearance point (frame 207). FIG. 3C shows the content of the management table 300 during reproduction of frame 207. Subsequently, the feature detection unit 103 also detects the face 260 during reproduction of frame 208, and the CPU 110 updates the position and size of the face 260 registered in the management table 300.

During reproduction of frame 209, since the feature detection unit 103 outputs a detection result that a face is not included, the CPU 110 determines that the face 260, which had been continuously detected until frame 208 disappeared, and registers the disappearance point (frame 209) of the face 260 in the management table 300. Since a predetermined period has passed after the face 250 disappeared, the information about the face 250 is deleted from the management table 300. FIG. 3D shows the management table 300 during reproduction of frame 209. In this manner, similar processing is performed during reproduction of frames 210 to 216.

Now, a description will be made of the operation of the video camera 100, during reproduction of a movie, when a user gives a rewinding instruction to perform rewinding through operation of the operation unit 111.

Figure 4:
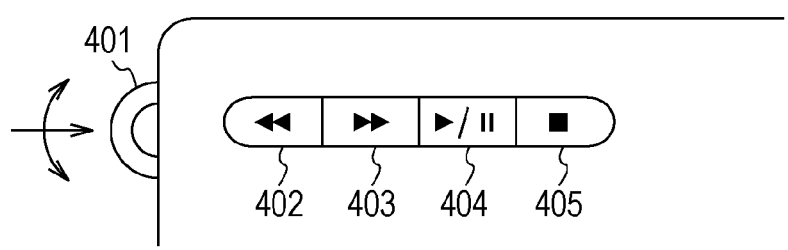
FIG. 4 is an external view of an operation unit.

FIG. 4 shows an external view of the operation unit 111. The operation unit 111 includes a dial switch 401, a rewinding button 402, a fast-forwarding button 403, a reproducing/pause button 404, and a stop button 405.

Figure 5:
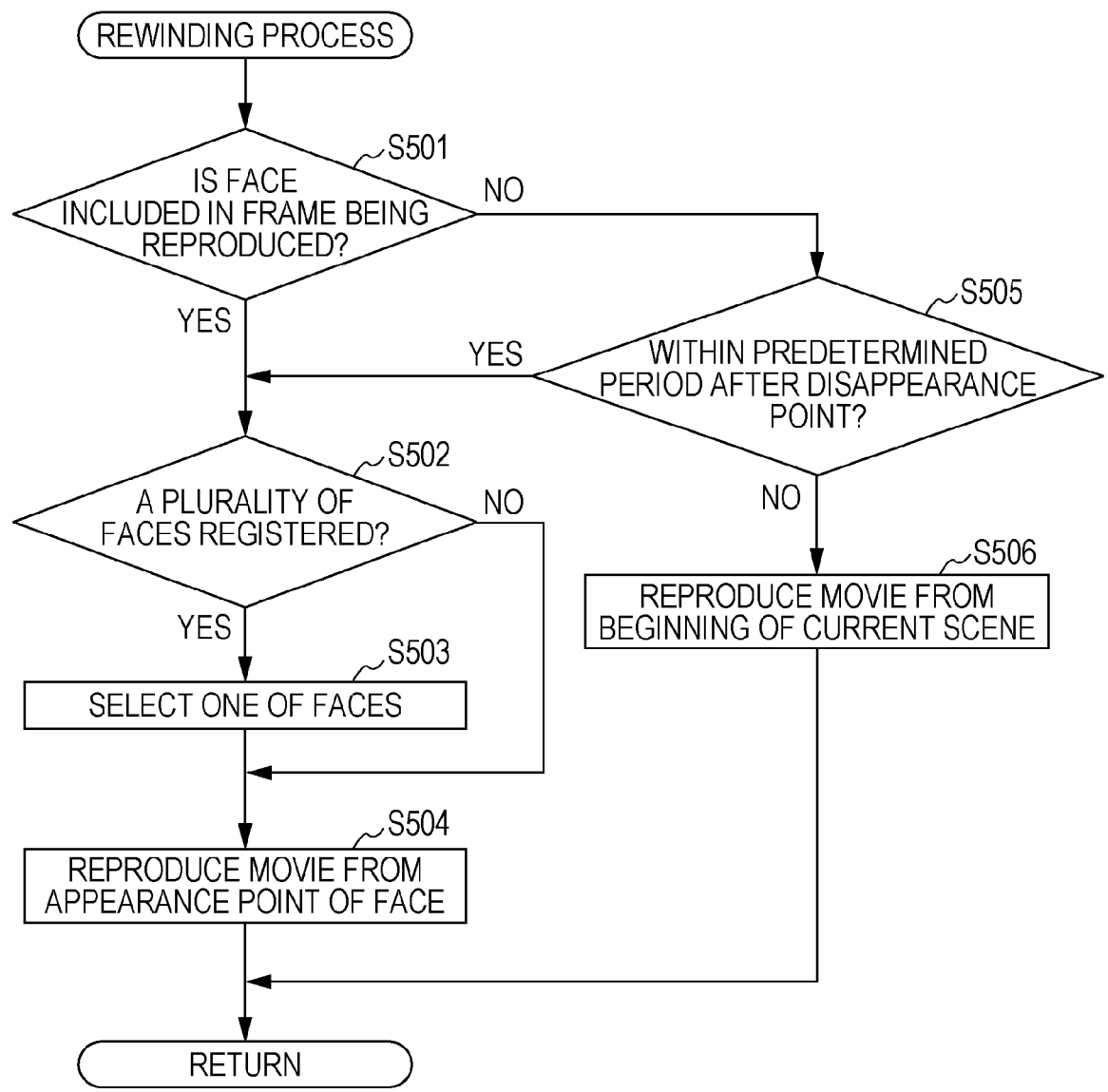
FIG. 5 is a flowchart of a rewinding process according to an embodiment.

FIG. 5 shows a flowchart of a process performed by the CPU 110 when the rewinding button 402 is operated during reproduction of a movie.

As described above, when a rewinding instruction is given, it is detected whether or not information about the face of a person who has appeared is registered in the management table. It is determined whether or not a face is included in the frame being reproduced when a rewinding instruction was given (S501). When a face is not included in the frame being reproduced, it is further detected whether or not information about a face which disappeared within a predetermined period (within three seconds) prior to the current point is registered in the management table. Then it is determined whether or not the frame being reproduced at the time of receiving the rewinding instruction is a frame that was reproduced within a predetermined period after the disappearance point of the face (S505). When it is determined from the determination result that the rewinding instruction was not given within the predetermined period after the disappearance point of the face, the disk control unit 105 and other units are controlled to reproduce a movie signal from the beginning of the scene currently being reproduced (S506).

When a face is included in the frame being reproduced at the time of receiving the rewinding instruction in step S501, or when the rewinding instruction is given within a predetermined period after the disappearance point of a face in step S505, it is determined whether or not information about a plurality of faces is registered in the management table (S502). When it is determined from the result of the determination that information about a plurality of faces is registered, one of the plurality of faces is selected (S503).

In the present embodiment, a priority level is assigned to each of the plurality of faces on the basis of a predetermined condition, and the information about a face having the highest priority is selected. For instance, in the present embodiment, a priority level is assigned to a face on the basis of the distance of the face from the center of a screen, the size of the face, and the period of time elapsed since its appearance, etc. When only information about a single face is registered in step S502, the information about the single face is selected.

Then, on the basis of the management table, the disk control unit 105 and other units are controlled to reproduce a movie signal from the appearance point of the selected face (S504).

For instance, in the case of reproducing the movie shown in FIG. 2, when a rewinding instruction is given during reproduction of frames from the first frame 201 to a frame immediately prior to frame 203, a movie is reproduced from frame 201. When a rewinding instruction is given during reproduction of frames form frame 203 to a frame immediately prior to frame 205, a movie is reproduced from frame 203, which is the appearance point of the face 250. In other words, a movie is reproduced from the appearance point of the face 250 which exists prior, on the time axis, to the frame being reproduced at the time when a rewinding instruction is given.

When a rewinding instruction is given during reproduction of frames from frame 205 to a frame immediately prior to frame 207, a movie is reproduced after going back to the appearance point of either the faces 250 or 260, for example, frame 203, which is the appearance point of the face 250. When a rewinding instruction is given during reproduction of frames from frame 207 to a frame immediately prior to frame 209, a movie is reproduced after going back to frame 205, which is the appearance point of the face 260.

When a rewinding instruction is given, during reproduction of frames from frame 209 to a frame immediately prior to frame 211, a movie is reproduced after going back to frame 205, which is the appearance point of the face 260. Likewise, when a rewinding instruction is given during reproduction of frames 211 to 216, the CPU 110 performs similar rewinding processing by controlling each unit.

In this manner, in the present embodiment, when a rewinding instruction is given during reproduction of a movie, the movie is automatically reproduced after going back to the appearance point of the face that is included in the frame being reproduced at the time the instruction was given. Therefore, it is easy to repeatedly reproduce a scene that includes a person who is included in the movie being reproduced.

In the present embodiment, a movie is reproduced even in the case in which a rewinding instruction is given in a predetermined period after a face disappeared, after going back to the appearance point of the face; however, not limited to this, a movie may be reproduced only when a rewinding instruction is given during reproduction of a frame that includes a face, after going back to the appearance point of the face.

Reproduction of a movie may also be started from a frame prior to the frame corresponding to the appearance point of a face, rather than starting from the frame corresponding to the appearance point of the face. For instance, reproduction may be started a predetermined period before the frame corresponding to the appearance point of a face.

In particular, when an interval between face detection operations performed by the feature detection unit 103 is long, for example, 10 seconds, the reproduction of a movie may be started after going back to a frame prior to the appearance point registered in the management table. This allows reproduction to be started from a point of time when a face actually appeared, even when an interval between face detection operations is long.

A second embodiment according to the present invention will now be described.

A video camera according to the present embodiment has the same configuration as that of the video camera 100 shown in FIG. 1. In the present embodiment, the feature portions of a movie are detected during recording of the movie, and the detection results are recorded on the disk 106 as additional information about the movie. When the movie signal is reproduced, reproduction of the movie is controlled on the basis of this additional information.

Hereinafter, the operation of the video camera 100 during recording of a movie is described.

When instructed to record a movie, the image processing unit 102 processes a movie signal output from the image capturing unit 101, and stores it in the memory 114. The feature detection unit 103 detects face portions in the movie signal stored in the memory 114 as described above, and outputs the detection results to the CPU 110. Also in the present embodiment, the feature detection unit 103 detects face portions that are included in frames selected at intervals of a predetermined period. Then a management table is created which is used to register information about the appearance point of a face that is detected during recording of a movie. Further, when recording of a movie is terminated, a record table that describes information about the appearance point of each face is created on the basis of the management table, and recorded on the disk 106 in association with the movie signal.

When the movie shown in FIG. 2 is captured, for example, the feature detection unit 103 detects the face 250 during capturing of frame 203. On the basis of the detection result, the CPU 110 registers the position, size and appearance point of the face 250 in the management table 300 stored in the RAM 112. FIG. 6A shows the management table 300 during capturing of frame 203.

Subsequently, the feature detection unit 103 also detects the face 250 during capturing of frame 204. The CPU 110 compares the detection result with the content registered in the management table 300 shown in FIG. 6A. On the basis of the compared positions and sizes, it is determined that the detected face 250 is the same as the face registered during frame 203, and the position and size of the face 250 registered in the management table 300 are updated.

Likewise, during capturing of frame 205, the feature detection unit 103 detects the face 260 in addition to the face 250, and the CPU 110 registers the position, size and appearance point in the management table 300.

During capturing of frame 207, since the face 250 which had been continuously detected until frame 206 disappeared, the CPU 110 deletes the information about the position and size of the face 250 from the management table 300. Subsequently, the feature detection unit 103 also detects the face 260 during capturing of frame 208, and the CPU 110 updates the position and size of the face 260 registered in the management table 300. During capturing of frame 209, since face 260, which had been continuously detected until frame 208, disappeared, the CPU 110 deletes the information about the position and size of the face 250 from the management table 300.

In this manner, similar processing is performed during capturing of frames 210 to 216. FIG. 6B shows the content of the management table 300 after capturing of a movie until frame 216 is finished.

When instructed to stop recording of a movie, the CPU 110 creates a record table showing the appearance point of each face on the basis of the information about a face and the appearance point thereof registered in the management table 300. When the movie shown in FIG. 2 has been recorded, for example, the CPU 110, after the termination of recording, creates a record table 600 shown in FIG. 6C on the basis of the management table shown in FIG. 6B. The CPU 110, by controlling the disk control unit 105, records the created record table 600 in association with the movie signal on the disk 106.

The operation of the video camera 100 during reproduction of a movie recorded on the disk 106 will now be described. In the present embodiment, when a movie recorded on the disk 106 is reproduced, the CPU 110, by controlling the disk control unit 105, reads the record table 600 recorded on the disk 106 and stores it in the RAM 112.

Hereinafter, a description will made of the operation of the video camera 100 when a user gives an instruction to perform rewinding or fast-forwarding through operation of the operation unit 111 during reproduction of a movie. FIG. 7 shows a flowchart of a process performed by the CPU 110 according to the present embodiment. The flow starts when an instruction to perform rewinding or fast-forwarding is given during reproduction of a movie, which is executed by reproducing a movie signal from the disk 106, as described above.

First, it is determined whether or not the given instruction is a rewinding instruction (S701). When it is determined that the given instruction is a rewinding instruction, the CPU 110 checks the appearance points of faces that are registered in the record table stored in the RAM 112, and determines whether or not appearance points exist prior to the frame that was being reproduced when the rewinding instruction was received (S702) When appearance points exist prior to the frame, the most recent appearance point of a face is detected, and the disk control unit 105 and other units are controlled such that a movie is reproduced after going back to the appearance point (S703). When appearance points do not exist prior to the frame that was being reproduced when the rewinding instruction was given, a movie is reproduced after going back to the beginning of the scene being reproduced (S704).

When it is determined that the given instruction is a fast-forwarding instruction in step S701, the CPU 110 checks the appearance points of faces that are registered in the record table stored in the RAM 112, and determines whether or not appearance points exist subsequent to the frame that was being reproduced when the rewinding instruction was received (S705) When appearance points exist subsequent to the frame, the nearest appearance point of a face is detected, and the disk control unit 105 and other units are controlled such that a movie is reproduced after going forward to this next appearance point (S706). When an appearance point does not exist subsequent to the frame that was being reproduced when the fast-forwarding instruction was given, a movie is reproduced after going forward to the beginning of a scene immediately following the scene being reproduced (S707).

For instance, when a rewinding instruction is given during reproduction of frames from frame 201 to a frame immediately prior to frame 203 shown in FIG. 2, there is not the appearance point of a face prior to the point at which the rewinding instruction was given, in the record table 600 shown in FIG. 6C. Hence, the CPU 110 controls each unit such that a movie is reproduced, after going back to the beginning of the scene being reproduced, starting from frame 201.

When a rewinding instruction is given during reproduction of frames from frame 203 to a frame immediately prior to frame 205, the CPU 110 controls each unit such that a movie is reproduced after going back to frame 203, which is the nearest appearance point prior to the point when the rewinding instruction was given. When a rewinding instruction was given during reproduction of frames 205 to 211, the CPU 110 controls each unit such that a movie is reproduced after going back to frame 205, which is the nearest prior appearance point.

In this manner, when a rewinding instruction was given during reproduction of frames 211 to 216, the CPU 110 similarly controls each unit such that a movie is reproduced after going back to the nearest prior appearance point of a face.

When a fast-forwarding instruction is given, during reproduction of frames from frame 201 to a frame immediately prior to frame 203 shown in FIG. 2, the CPU 110 controls each unit such that a movie is reproduced after going forward to the frame 203, which is the nearest subsequent appearance point, on the basis of the record table 600 shown in FIG. 6C.

When a fast-forwarding instruction is given during reproduction of frames from frame 203 to a frame immediately prior to frame 205, the CPU 110 controls each unit such that a movie is reproduced after going forward to frame 205, which is the nearest subsequent appearance point.

In this manner, when a fast-forwarding button 303 is pressed during reproduction of frames 205 to 212, the CPU 110 similarly controls each unit such that a movie is reproduced after going forward to the nearest appearance point of a face subsequent to the point at which the fast-forwarding instruction is given. When a fast-forwarding instruction is given during reproduction of frames 213 to 216, since there is not a subsequent appearance point in the record table 600 shown in FIG. 6C, the CPU 110 controls each unit such that a movie is reproduced from the beginning of the next scene.

In this manner, according to the present embodiment, a scene including a person is easily reproduced repeatedly or a scene not including a person is easily skipped, during reproduction of a movie.

Next a third embodiment will be described.

A video camera according to the present embodiment has the same configuration as that of the video camera 100 shown in FIG. 1. In the present embodiment, during recording of a movie, faces included in the captured movie are detected and it is determined whether or not the faces detected in respective frames are the same as one another. The determination result is recorded on the disk 106 as additional information about the movie, and fast-forwarding processing is performed using this information during reproduction.

Hereinafter, the operation of the video camera 100 during recording of a movie is described.

When instructed to record a movie, the image processing unit 102 processes a movie signal output from the image capturing unit 101, and stores it in the memory 114. The feature detection unit 103 detects face portions in the movie signal stored in the memory 114 as described above, and outputs the detection result to the CPU 110. Also in the present embodiment, the feature detection unit 103 detects face portions that are included in frames selected at intervals of a predetermined period. In the present embodiment, the feature detection unit 103 further outputs the feature information about the detected faces to the CPU 110. In the present embodiment, since the face of a person is detected as a feature portion, the feature information is vector information obtained by capturing feature points such as eyes, a nose and a mouth. Such feature information about a detected face is output to the CPU 110 by the feature detection unit 103.

On the basis of the detection result output from the feature detection unit 103, the CPU 110 creates a management table containing the appearance points and disappearance points of the detected faces, and stores it in the RAM 112.

When the movie shown in FIG. 2 is captured, for example, the feature detection unit 103 detects the face 250 during capturing of frame 203. On the basis of the detection result, the CPU 110 registers the position, size and appearance point of the face 250 in the management table 300 stored in the RAM 112. FIG. 8A shows the management table 300 during capturing of frame 203.

Subsequently, the feature detection unit 103 also detects the face 250 during capturing of frame 204. The CPU 110 compares the detection result with the content registered in the management table 300 shown in FIG. 8A. On the basis of the compared positions and sizes, it is determined that the detected face 250 is the same as the face registered during capturing of frame 203, and the position and size of the face 250 registered in the management table 300 are updated. The feature information about the face 250 is updated using the average for the frames up to that time.

Likewise, during capturing of frame 205, the feature detection unit 103 detects the face 260 in addition to the face 250, and the CPU 110 registers the position, size and appearance point in the management table 300 stored in the RAM 112. During capturing of frame 207, since the face 250 which had been continuously detected until frame 206 disappeared, the CPU 110 deletes the information about the position and size of the face 250 from the management table 300 and registers information about the appearance point.

Subsequently, the feature detection unit 103 also detects the face 260 during capturing of frame 208, and the CPU 110 updates the position and size of the face 260 registered in the management table 300. During capturing of frame 209, since face 260 which had been continuously detected until frame 208 disappeared, the CPU 110 deletes the information about the position and size of the face 250 from the management table 300, and registers the information about the disappearance point.

In this manner, similar processing is performed during capturing of frames 210 to 216. FIG. 8B shows the content of the management table 300 after capturing of a movie until frame 216 is finished. Here, Ave ( ) denotes the average of feature information in the brackets. Reference numerals C205 to C208 denote feature information about the face 260 in frames 205 to 208. Likewise, reference numerals C311 to C312 denote feature information about the face 261 in frames 211 to 212, and reference numerals C413 to C414 denote feature information about the face 251 in frames 213 to 214.

When recording of a movie is terminated, the CPU 110 determines the identity of each registered face on the basis of feature information registered in the management table 300 stored in the RAM 112. The CPU 110 creates a record table in which faces that have the same identity, according to the determination, are assigned the same ID number. Then the disk control unit 105 is controlled by the CPU to store the created record table on the disk 106 in association with the movie signal.

FIG. 8C shows a record table 800 created on the basis of the management table 300 shown in FIG. 8B. Among the faces registered in the management table 300 shown in FIG. 8B, it is determined that the faces 250 and 251 are the same and the faces 260 and 261 are the same. The faces 250 and 251 are assigned an ID number of 1, and the faces 260 and 261 are assigned an ID number of 2 in the created record table 800.

The operation of the video camera 100 during reproduction of a movie recorded on the disk 106 will now be described. In the present embodiment, when a movie recorded on the disk 106 is reproduced, the CPU 110, by controlling the disk control unit 105, reads a record table recorded on the disk 106 and stores it in the RAM 112.

Figure 9:
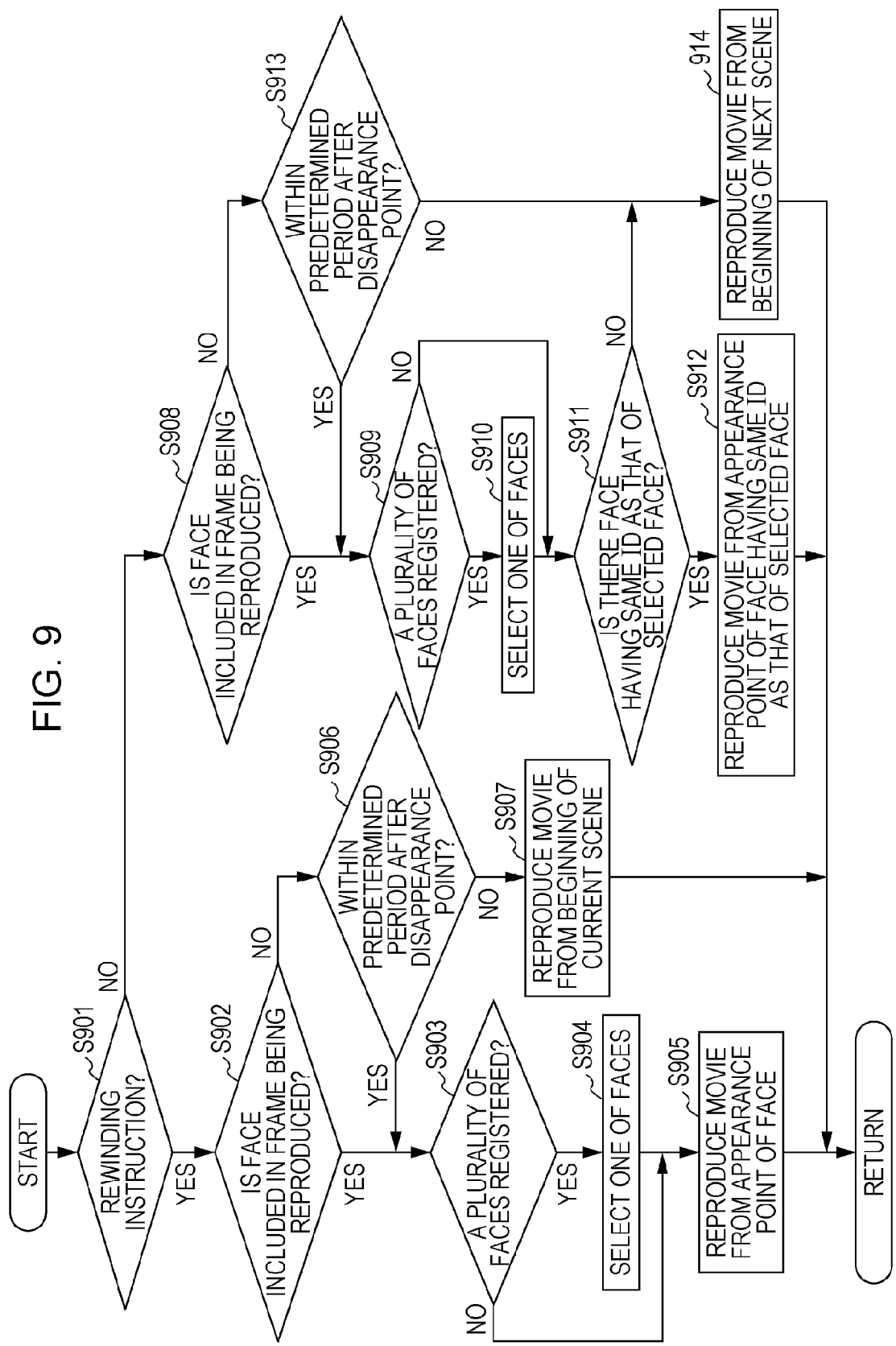
FIG. 9 is a flowchart of a process performed during reproduction.

Hereinafter, a description will made of the operation of the video camera 100 when a user gives an instruction to perform rewinding or fast-forwarding during reproduction of a movie through operation of the operation unit 111. FIG. 9 shows a flowchart of a process performed by the CPU according to the present embodiment. The flow starts when an instruction to perform rewinding or fast-forwarding is given during reproduction of a movie, which is executed by reproducing a movie signal from the disk 106, as described above.

First, it is determined whether or not the given instruction is a rewinding instruction (S901). When it is determined that the given instruction is a rewinding instruction, the CPU 110 detects whether or not a face is included in the frame that was being reproduced when the rewinding instruction was given, on the basis of the record table stored in the RAM 112. Specifically, it is determined whether the frame that was being reproduced when the rewinding instruction was given is included in a period from the appearance to disappearance of a person registered in the record table (S902). When a face is not included in the frame being reproduced, it is further detected whether or not the information about a face having a disappearance point in the vicinity (within three seconds after the disappearance) is registered in the record table. Then it is determined whether or not the frame being reproduced when the rewinding instruction was given is a frame that was reproduced within the predetermined period (three seconds) from the disappearance point of the face (S906). When it is determined that the rewinding instruction was not given within the predetermined period from the disappearance point of the face, the disk control unit 105 and other units are controlled such that a movie is reproduced from the beginning of the scene currently being reproduced (S907).

When a face is included in the frame being reproduced when the rewinding instruction was given, or when the rewinding instruction was given within the predetermined period after the disappearance point in step S906, it is determined whether or not a plurality of faces are registered in the management table (S903). When it is determined that a plurality of faces are registered, one of the plurality of faces is selected (S904). At this time, the face that appeared least recently is selected in the present embodiment.

Then the disk control unit 105 and other units are controlled such that a movie is reproduced from the appearance point of the selected face, on the basis of the record table (S905).

When the given instruction was a fast-forwarding instruction in step S901, the CPU 110 determines whether or not a face is included in a frame that was being reproduced when the fast-forwarding instruction was given, on the basis of the record table stored in the RAM 112 (S908). When a face is not included in the frame being reproduced when the rewinding instruction was given, it is further detected whether or not the information about a face having a disappearance point in the vicinity (within three seconds after the disappearance) is registered in the record table. Then it is determined whether or not the frame being reproduced when the fast-forwarding instruction was given is a frame that was reproduced within the predetermined period (three seconds) from the disappearance point of the face (S913). When it is determined that the fast-forwarding instruction was not given within the predetermined period from the disappearance point of the face, the disk control unit 105 and other units are controlled such that a movie is reproduced from the beginning of the scene following the scene being currently reproduced (S914).

When a face is included in the frame being reproduced when the fast-forwarding instruction was given, or when the fast-forwarding instruction was given within the predetermined period after the disappearance point of a face in step S913, it is determined whether or not a plurality of faces are registered in the management table (S909). When it is determined that a plurality of faces are registered, one of the plurality of faces is selected (S910). At this time, the face that appeared least recently is selected in the present embodiment.

Then, it is determined whether or not a face having the same ID as that of the selected face is registered in the record table. When a face having the same ID as that of the selected face is registered in the record table, it is determined whether or not the appearance point corresponding to the face exists after the current position (S911). When such an appearance point exists, the disk control unit 105 and other units are controlled such that a movie is reproduced after going forward to the next appearance point of the face having the same ID as that of the selected face (S912).

When a face having the same ID as that of the selected face is registered in the record table (S911), or when the appearance point of the face is not present after the current frame, the flow proceeds to step S914, and a movie is reproduced from the beginning of the next scene.

For instance, when a rewinding instruction is given during reproduction of frames from frame 201 to a frame immediately prior to frame 203 in FIG. 2, there does not exist the appearance point of a face in the record table 800 shown in FIG. 8C prior to the point at which the rewinding instruction was given. Hence, the CPU 110 controls each unit such that a movie is reproduced after going back to the beginning of the scene being reproduced.

When a rewinding instruction is given during reproduction of frames from frame 203 to a frame immediately prior to frame 205, the CPU 110 controls each unit such that a movie is reproduced after going back to frame 203, which is the appearance point of the face 250. When a rewinding instruction is given during reproduction of frames from frame 205 to a frame immediately prior to frame 207, the CPU 110 selects the face 250, which appeared before the face 260 among the faces 250 and 260, and controls each unit such that a movie is reproduced after going back to frame 203, which is the appearance point of the face 250. When a rewinding instruction is given during reproduction of frames from frame 207 to a frame immediately prior to frame 209, the CPU 110 controls each unit such that a movie is reproduced after going back to frame 205, which is the appearance point of the face 260.

In this manner, when a rewinding instruction is given during reproduction of frames 211 to 216, the CPU 110 similarly controls each unit such that a movie is reproduced after going back to the nearest prior appearance point of a face.

When a fast-forwarding instruction is given during reproduction of frames from frame 201 to a frame immediately prior to frame 203, the CPU 110 controls each unit such that a movie is reproduced from the beginning of the next scene. When a fast-forwarding instruction is given during reproduction of frames from frame 203 to a frame immediately prior to frame 205, the CPU 110 controls each unit such that a movie is reproduced after going forward to frame 213, which is the appearance point of the face 251 having the same ID as that of the face 250.

When a fast-forwarding instruction is given during reproduction of frames from frame 205 to a frame immediately prior to frame 207, the CPU 110 selects the face 250, which appeared before the face 260 among the faces 250 and 260, and controls each unit such that a movie is reproduced after going forward to frame 213, which is the appearance point of the face 251 having the same ID as that of the face 250. When a fast-forwarding instruction is given during reproduction of frames from frame 207 to a frame immediately prior to frame 209, the CPU 110 controls each unit such that a movie is reproduced after going forward to frame 211, which is the appearance point of the face 261 having the same ID as that of the face 260.

When a fast-forwarding instruction is given during reproduction of frames 211 to 214, the CPU 110 controls each unit such that a movie is reproduced from the beginning of the next scene, since there is not the appearance point of a face having the same ID as those of the current faces afterwards.

In this manner, according to the present embodiment, it is easy to repeatedly reproduce a scene that includes a particular person or to reproduce the next scene that includes the particular person by cueing during reproduction of a movie.

A fourth embodiment will be described. A video camera according to the present embodiment has the same configuration as that of the video camera 100 shown in FIG. 1. In the present embodiment, the positions and sizes of detected feature portions of a movie are recorded as additional information attached to each frame of the movie. Further, in the present embodiment, when a plurality of faces are included in the same frame during reproduction of a movie, a user is allowed to select one of the faces. It is possible to perform reproduction by cueing the appearance point of the selected face or by cueing the next appearance point of the same face.

Hereinafter, the operation of the video camera 100 during recording of a movie is described.

When instructed to record a movie, the image processing unit 102 processes a movie signal output from the image capturing unit 101, and stores it in the memory 114. The feature detection unit 103 detects face portions in the movie signal stored in the memory 114 as described above, and outputs the detection results to the CPU 110. Also in the present embodiment, the feature detection unit 103 detects face portions that are included in frames selected at intervals of a predetermined period. In the present embodiment, the feature detection unit 103 also outputs the feature information about the detected faces to the CPU 110.

The CPU 110 creates a management table based on the output of the feature detection unit 103, and updates the content of the management table every time a new detection result is output from the feature detection unit 103. The CPU 110, by controlling the disk control unit 105, records additional information showing the positions and sizes of the faces registered in the management table in such a manner as to be attached to each frame of a movie signal to be recorded.

When the movie shown in FIG. 2 is captured, for example, the feature detection unit 103 detects the face 250 during capturing of frame 203. On the basis of the detection result, the CPU 110 registers the position, size and appearance point of the face 250 in the management table 300 stored in the RAM 112. FIG. 8A shows the management table 300 during capturing of frame 203.

Subsequently, the feature detection unit 103 also detects the face 250 during capturing of frame 204. The CPU 110 compares the detection result with the content registered in the management table 300 shown in FIG. 8A. On the basis of the compared positions and sizes, it is determined that the detected face 250 is the same as the face registered during frame 203, and the position and size of the face 250 registered in the management table 300 are updated. The feature information about the face 250 is updated using the average of the frames up to that time.

Likewise, during capturing of frame 205, the feature detection unit 103 detects the face 260 in addition to the face 250, and the CPU 110 registers the position, size and appearance point in the management table 300 stored in the RAM 112. During capturing of frame 207, since the face 250 which had been continuously detected until frame 206 disappeared, the CPU 110 deletes the information about the position and size of the face 250 from the management table 300 and registers information about the appearance point.

Subsequently, the feature detection unit 103 also detects the face 260 during capturing of frame 208, and the CPU 110 updates the position and size of the face 260 registered in the management table 300. During capturing of frame 209, since face 260, which had been continuously detected until frame 208, disappeared, the CPU 110 deletes the information about the position and size of the face 250 from the management table 300, and registers the information about the disappearance point.

In this manner, similar processing is performed during capturing of frames 210 to 216. FIG. 8B shows the content of the management table 300 after capturing of a movie until frame 216 is finished.

When recording of a movie is terminated, the CPU 110 determines the identity of each registered face on the basis of feature information registered in the management table 300 stored in the RAM 112. The CPU 110 creates a record table where faces that have the same identity, according to the determination, are assigned the same ID number.

FIG. 8C shows a record table 800 created on the basis of the management table 300 shown in FIG. 8B. Among the faces registered in the management table 300 shown in FIG. 8B, it is determined that the faces 250 and 251 are the same and the faces 260 and 261 are the same. The faces 250 and 251 are assigned ID number 1, and the faces 260 and 261 are assigned ID number 2 in the created record table 800.

Then the disk control unit 105 is controlled by the CPU to store the created record table 800 on the disk 106 in association with the movie signal.

Figures 10, 11:
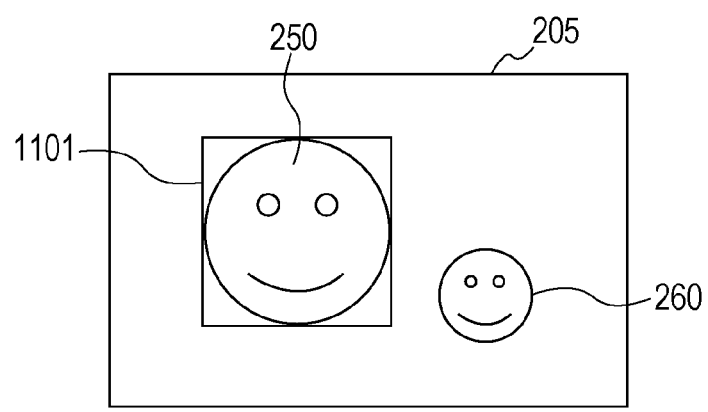
FIG. 10 is a table showing additional information.
FIG. 11 illustrates an example of a reproduced screen.

FIG. 10 shows the additional information recorded in association with the movie signal. When the movie shown in FIG.

2 is recorded, the additional information shown in FIG. 10 is attached to frames from frame 205 to a frame immediately prior to frame 207.

The operation of the video camera 100 during reproduction of a movie recorded on the disk 106 will now be described. In the present embodiment, when a movie recorded on the disk 106 is reproduced, the CPU 110, by controlling the disk control unit 105, reads the record table recorded on the disk 106 and stores it in the RAM 112.

In the present embodiment, the CPU 110, by controlling the disk control unit 105, acquires additional information attached to each frame of a reproduced movie. The CPU 110 detects the positions and sizes of faces in each frame of the movie on the basis of the acquired additional information about each frame. By controlling the rendering unit 107, the CPU 110 displays an image of a detection frame, which is superimposed on the face portion in each screen of the reproduced movie. When a plurality of faces are included in one frame, the CPU 110 displays a detection frame on one of the plurality of face portions.

A user can select a face on which the detection frame is to be displayed among a plurality of faces by operating the dial switch 401 of the operation unit 111 shown in FIG. 4. Note that the CPU 110 displays the detection frame when a user operates the dial switch 401, and stops displaying the detection frame when a predetermined period of time has elapsed after the end of the operation.

FIG. 11 shows an example of a reproduced screen during reproduction of the movie shown in FIG. 2. A detection frame 1101 is displayed so as to be superimposed on the face 250 during reproduction of frame 205. Since a plurality of faces are included in frames from frame 205 to a frame immediately prior to frame 207, the CPU 110 switches the face selected by the detection frame 1101 when a user operates the dial switch 401 during reproduction of these frames.

In a state in which a detection frame is displayed for the face (feature portion) 250, the rewinding button 402 may be pressed, for example. In this case, the CPU 110 controls, on the basis of the record table, the disk control unit 105 and other units such that a movie is reproduced after going back to a predetermined period (for example, three seconds) prior to frame 203, which is the appearance point of the face (feature portion) 250. However, when the appearance point is within the predetermined period from the beginning of the movie, reproduction is performed from the beginning of the movie.

Processing during reproduction in the present embodiment is similar to the processing described by the flowchart shown in FIG. 9; however, the methods used in selecting a face in steps S904 and S910 are different.

In other words, a face selected by a user using the detection frame is selected in the present embodiment, when a plurality of faces are included in a screen being reproduced at the time at which a rewinding or fast-forwarding instruction is given. A movie is reproduced through cueing from the appearance point of the face selected by the user.

Specifically, when a fast-forwarding instruction is given during reproduction of frames from frame 205 to a frame immediately prior to frame 207 in the movie shown in FIG. 2, for example, the faces 250 and 260 are included in screens being reproduced. When the face 250 is selected using the detection frame among the faces 250 and 260, the CPU 110 controls each unit such that a movie is reproduced through cueing from frame 213, which is the appearance point of the face 251 having the same ID as that of the face 250.

As described above, according to the present embodiment, it is easy to repeatedly reproduce a scene that includes a person or to reproduce the next scene that includes a person through cueing.

The above-described function units included in the configuration of the reproducing apparatus and image recording/reproducing apparatus according to the embodiments of the present invention are realized by the operation of a program stored in, for example, a RAM or a ROM of a computer. The program and a computer readable recording medium containing the program are included in the present invention.

The present invention can be realized as a system, an apparatus, a method, a program, a recording medium, or the like. Specifically, the present invention may be applied to a system configured to include a plurality of apparatuses or a system consisting of a single apparatus.

The present invention includes a case in which a software program (corresponding to the flowcharts illustrated in FIGS. 5, 7 and 9 in the embodiments described above) executing the steps of controlling method in the above-described image reproduction apparatus is directly or remotely provided to a system or apparatus and a computer in the system or apparatus reads and executes the program.

Therefore, the program code itself which is installed in a computer to realize the functional processing of the embodiments using the computer can be said to realize the present invention. In other words, the present invention includes a computer program itself for realizing the functional processing of the present invention.

In this case, the computer program may be of any form such as object code, a program executed by an interpreter, and script data provided to an OS, as long as the form used functions as a program.

Examples of computer-readable storage media for providing the computer program include a floppy (registered trademark) disk, a hard disk, an optical disc, a magneto-optical disc (MO), a CD-ROM, a CD-R, a CD-RW, a magnetic tape, a non-volatile memory card, a ROM, and a DVD (DVD-ROM and DVD-R).

Another example method of providing the computer program is downloading the program of the invention from a home page on the Internet into a storage medium such as a hard disk, by accessing the home page using a browser of a client computer. In this case, the program may be a compressed file with a self-installing capability.

The program code making up the program may be divided into a plurality of files so that each of the files is downloaded from a different home page. In other words, the invention also includes a WWW server allowing a plurality of users to download the program files for realizing the functional processing of the invention.

Another method may be a method of distributing to users the program of the embodiments in an encrypted form recorded on a storage medium such as a CD-ROM. In this case, a user who satisfies a certain condition may be allowed to download the information about a key for decryption, and to install and execute the encrypted computer program.

Further, in addition to the manner in which the computer realizes the functions of the embodiments described above by executing the read out program, the functions of the embodiments may be realized in such a manner that the OS or other software running on the computer performs part or all of the actual processing.

Further, the program which is read out from a storage medium may be stored in a memory provided on a function expansion board inserted into the computer or a memory provided in a function expansion unit connected to the computer. In this case, the CPU or other processor provided on the function expansion board or in the function expansion unit executes part or all of the actual processing in accordance with the instructions given by the program, thereby realizing part or all of the functions of the embodiments described above. According to the above described embodiments of the present invention, a movie may be reproduced from a point associated with the appearance point according to an instruction to change a reproduction point (e.g., instructions to rewind, to fast-forward, or to perform cueing).

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-186242 filed Jul. 17, 2008 and No. 2009-119010 filed May 15, 2009, which are hereby incorporated by reference herein in their entirety.

What is claimed is:

1. A reproducing apparatus having a CPU and a memory used by the CPU, comprising:
a reproducing unit that reproduces a movie signal of a plurality of scenes from a recording medium;
a detection unit that detects an appearance point at which a feature image appears and a disappearance point at which the feature image disappears in a movie corresponding to the movie signal reproduced by the reproducing unit;
an instruction receiving unit that receives, during the reproduction of the movie signal by the reproducing unit, a predetermined instruction for instructing a skip of a reproduction position of the movie signal being reproduced; and
a control unit that detects, in response to the predetermined instruction received by the instruction receiving unit during the reproduction of the movie signal, the reproduction position of the movie signal of when the instruction receiving unit receives the predetermined instruction and controls the reproducing unit based on the reproduction position of the movie signal of when the predetermined instruction is received by the instruction receiving unit,
wherein the control unit determines whether the reproduction position of the movie signal of when the predetermined instruction is received by the instruction receiving unit during the reproduction of the movie signal is a position within a predetermined period from the disappearance point detected by the detection unit and controls the reproduction unit in accordance with a result of the determination, and
wherein if it is determined that the reproduction position of the movie signal of when the predetermined instruction is received by the instruction receiving unit is the position within the predetermined period from the disappearance point, the control unit selects the nearest appearance point to the reproduction position of the movie signal of when the predetermined instruction is received by the instruction receiving unit among a plurality of the appearance points detected by the detection unit and controls the reproducing unit to skip the reproduction position of the movie signal to a reproduction position associated with the selected appearance point, and if it is determined that the reproduction position of the movie signal of when the predetermined instruction is received by the instruction receiving unit is not the position within the predetermined period from the disappearance point, the control unit controls the reproduction unit to skip the reproduction position of the movie signal to a head position of the scene.

2. The reproducing apparatus according to claim 1, wherein the detection unit includes a feature detection unit that detects the feature image from the reproduced movie signal.

3. The reproducing apparatus according to claim 2, wherein the feature detection unit detects the feature image from frames selected at intervals of a predetermined period from the reproduced movie signal.

4. The reproducing apparatus according to claim 1, wherein if the feature image is included in a frame of the movie signal of when the instruction receiving unit receives the predetermined instruction, the control unit selects the nearest appearance point to the reproduction position of the movie signal of when the predetermined instruction is received among the plurality of appearance points of the feature image included in the frame of the movie signal of when the predetermined instruction is received.

5. The reproducing apparatus according to claim 1, wherein if it is determined that the reproduction position of the movie signal of when the predetermined instruction is received by the instruction receiving unit is the position within the predetermined period from the disappearance point, the control unit selects the appearance point nearest to and prior to the reproduction position corresponding to the predetermined instruction from among the plurality of appearance points.

6. The reproducing apparatus according to claim 1, wherein the detection unit detects the appearance point for each of a plurality of the feature images different from each other in the movie corresponding to the reproduced movie signal, and the control unit selects the nearest appearance point to the reproduction position of the movie signal of when the predetermined instruction is received among the plurality of appearance points of one of the plurality of different feature images if it is determined that the reproduction position of the movie signal of when the predetermined instruction is received by the instruction receiving unit is the position within the predetermined period from the disappearance point.

7. The reproducing apparatus according to claim 6, further comprising a selection unit that selects any one of the plurality of different feature images, wherein if it is determined that the reproduction position of the movie signal of when the predetermined instruction is received is the position within the predetermined period from the disappearance point, the control unit selects the nearest appearance point to the reproduction position of the movie signal of when the predetermined instruction is received among the plurality of appearance points of the feature image selected by the selection unit.

8. The reproducing apparatus according to claim 1, further comprising:
an image capturing unit; and
a recording unit that records a movie signal output from the image capturing unit on the recording medium,
wherein the detection unit includes a feature detection unit that detects the feature image from the movie signal output from the image capturing unit, and the recording unit records information about the detected appearance point on the recording medium, and
wherein if it is determined that the reproduction position of the movie signal of when the predetermined instruction is received is the position within the predetermined period from the disappearance point, the control unit controls the reproducing unit, on the basis of the recorded information about the appearance point, such that the movie signal is reproduced from the position associated with the appearance point prior to the reproduction position of the movie signal of when the predetermined instruction is received.

9. The reproducing apparatus according to claim 1, further comprising an input unit that inputs a movie signal; and
a recording unit that records the movie signal input by the input unit on the recording medium,
wherein the detection unit includes a feature detection unit that detects, the feature image from the movie signal input by the input unit, and the recording unit records information about the detected appearance point, and
wherein if it is determined that the reproduction position of the movie signal of when the predetermined instruction is received is the position within the predetermined period from the disappearance point, the control unit selects the nearest appearance point to the reproduction position of the movie signal of when the predetermined instruction is received, on the basis of the recorded information about the appearance point.

10. The reproducing apparatus according to claim 1, wherein if it is determined that the reproduction position of the movie signal of when the predetermined instruction is received is the position within the predetermined period from the disappearance point, the control unit controls the reproducing unit to skip the reproduction position of the movie signal to a reproduction position a predetermined number of frames before the selected appearance point.

11. A reproducing method comprising the steps of:
reproducing a movie signal of a plurality of scenes from a recording medium;
detecting an appearance point at which a feature image appears and a disappearance point at which the feature image disappears in a movie corresponding to the reproduced movie signal;
receiving, during the reproduction of the movie signal, a predetermined instruction for instructing a skip of a reproduction position of the movie signal being reproduced;
detecting the reproduction position of the movie signal of when the predetermined instruction is received by the step of receiving in response to the predetermined instruction received during the reproduction of the movie signal;
determining whether the reproduction position of the movie signal of when the predetermined instruction is received is a position within a predetermined period from the detected disappearance point;
skipping the reproduction position of the movie signal to a reproduction position in accordance with a result of the step of determining,
wherein if it is determined that the reproduction position of the movie signal of when the predetermined instruction is received is the position within the predetermined period from the disappearance point, the step of skipping selects the nearest appearance point to the reproduction position of the movie signal of when the predetermined is received instruction among a plurality of the detected appearance points and skips the reproduction position of the movie signal to a reproduction position associated with the selected appearance point, and if it is determined that the reproduction position of the movie signal of when the predetermined instruction is received is not the position within the predetermined period from the disappearance point, the step of skipping skips the reproduction position of the movie signal to a head position of the scene.

* * * * *